March 27, 1945.　　　T. K. CHECKOS　　　2,372,251
WELDING ROD HOLDER
Filed Sept. 7, 1943
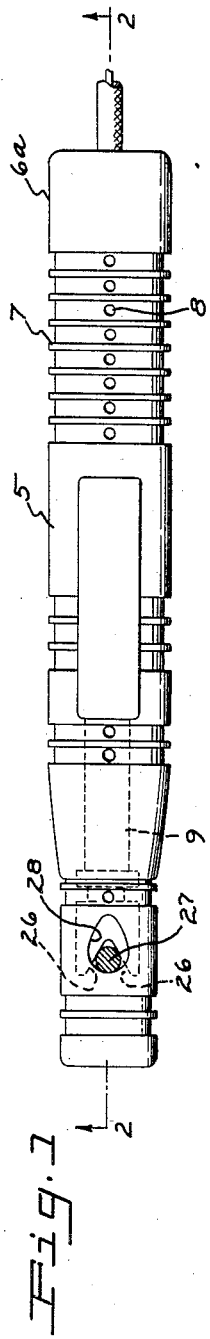
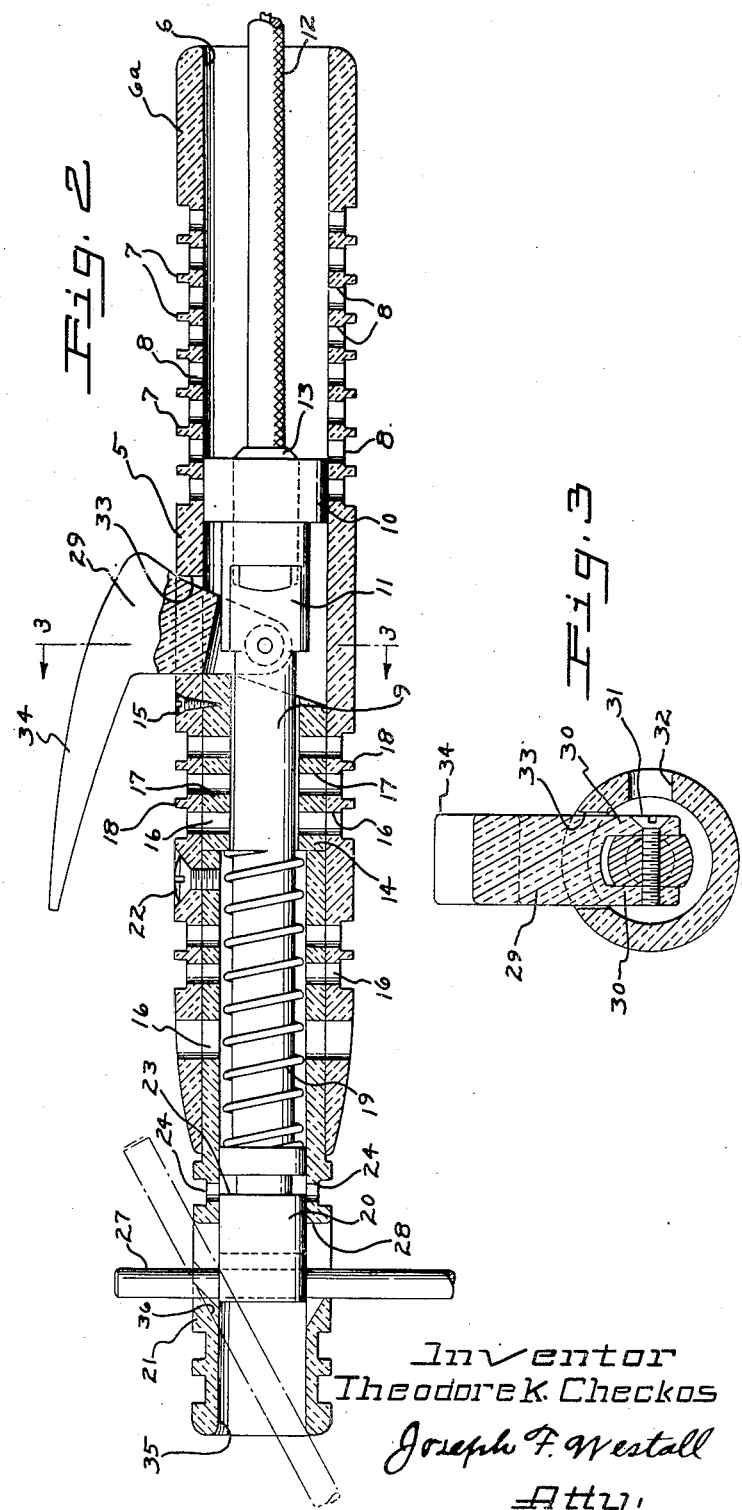
Inventor
Theodore K. Checkos
Joseph F. Westall
Atty.

Patented Mar. 27, 1945

2,372,251

UNITED STATES PATENT OFFICE 2,372,251

WELDING ROD HOLDER

Theodore K. Checkos, Los Angeles, Calif.

Application September 7, 1943, Serial No. 501,455

4 Claims. (Cl. 219—8)

This invention relates to welding rod holders of the general character commonly employed in electric welding for the dual purpose of providing a handle for the manipulation of the rod, and embodying means for releasably connecting the lead wire from a source of electricity to the electrode.

Numerous types of welding rod holders have heretofore been evolved which comprise, essentially, a handle embodying structure for releasably securing the electrode in contact with a flexible electric conduit leading from a source of power. Practical utility for its intended purpose requires further that such a tool be properly insulated, not only to protect the operator against contact with any of the electricity-conducting elements, but also against the tremendous heat conducted to the holder through the electrode.

While many of the prior art devices are adapted for holding a rod in a position suitable for use on work located below the shoulder level of the operator, overhead welding presents problems not met in a practical manner by such prior structures.

It is a principal object of the present invention to provide a holder of the character above generally alluded to, embodying means to frictionally grip the electrode at any point intermediate its ends whereby the arcing end of the electrode may be variably spaced from the axis of the holder, which means is positively operable in response to a resilient element to obviate any tendency of the rod to loosen as a result of vibration or rough usage, thus assuring a constant firm contact between the conductor and rod.

Another object is the provision of a holder having a pair of clamping surfaces against either of which a welding rod may be urged into engagement by a spring-actuated reciprocal element having biasing surfaces adapted to preclude lateral shifting of a rod engaged thereby so as to retain the rod, selectively, at different angles with respect to the longitudinal axis of the handle.

Another and highly important object of the invention is to provide a device insulated against both heat and inadvertent contact with the electricity-conducting members by the embodiment of a housing composed of non-conducting material, and incorporating means for facilitating the radiation of heat in combination with a plurality of air circulation passages around the metal conductors.

Other objects and corresponding advantages, such as for example as economy of manufacture, ease of operation, positive assurance of a good electrical contact between the lead wire and the electrode at all times, and durability in use will be apparent to those of skill in the art upon an examination of the following description read in the light of the accompanying drawing, in which:

Fig. 1 is an elevation of the tool illustrating the use of the tool in holding a welding rod, shown in cross section, in one of two operative positions;

Fig. 2 is an enlarged sectional view taken on lines 2—2 of Fig. 1, depicting the use of the tool in holding a welding rod at right angles to the axis of the device, and in dotted lines an alternative disposition of the welding rod;

Fig. 3 is a transverse sectional view taken on lines 3—3 of Fig. 2.

Referring to the drawing in detail, the numerals of which indicate similar parts throughout the several views, 5 designates a barrel composed of dielectric material by which the rod-gripping mechanism is housed. The barrel is provided with a uniform bore 6 and has a thin wall of varying thickness to assure a most desirable combination of sufficient strength with minimum weight. The rearward end of barrel 5 comprises a handle 6a formed with a plurality of annular ribs 7 which provide a suitable manual gripping surface and aid materially in radiating heat generated in the process of welding. A series of holes 8 are formed in the barrel between each pair of ribs 7 and are equi-spaced circumferentially on barrel 5 for circulation of air and the convection of heat.

A core 9 composed of copper or other good conductor of electricity is enclosed by barrel 5, an enlarged end 10 of which core 9 is slidable within bore 6 of the barrel so as to assure coaxial alignment of these parts. The portion of core 9 adjacent the enlarged end 10 is slightly reduced and flattened on opposite sides as at 11 for a purpose later referred to. A flexible wire lead line 12 from a source of electricity extends into barrel 5 and is secured by a plug 13 in a concentric opening provided therefor in the adjacent enlarged end 10 of the core. Encircling the core is a collar 14 which snugly fits the bore 6 of the barrel and is secured to the latter against longitudinal or rotative movement by a screw 15 threaded through the outside of the barrel. A series of ports 16 are formed in the collar which register with the ports 17 in the barrel; between pairs of the latter annular ribs 18 are interposed to assist in the conduction and radiation of heat. A helical spring 19 encircles the forward end of core 9 and is partially compressed against collar 14 by a circular head 20 composed of copper or the like threaded into the end of core 9. The head is of sufficient diameter to slidably engage the bore of a sleeve 21 which is fitted into the end of barrel 5 and projects from the forward end of the latter. The sleeve 21 and barrel 5 are secured against relative movement by a screw 22 countersunk in the barrel and threaded into the rearward end of the sleeve. The retaining head 20 is formed with an annular recess 23 which is adapted in operation to register with two pairs of diametrically opposed ports 24 in sleeve 21, so as to permit the circulation of air around the head and thereby facilitate convection of heat radiated therefrom. The forward end of the head 20 is V-shaped to engage between its bifurcations 26 a welding rod 27 adapted to be positioned in sleeve 21 transverse to the axis of the latter, as will appear. The device is adapted to hold the rod 27 in a position at right angles to the axis of the tool by the provision of a pair of elongated ports 28 disposed in diametrically opposed portions of the sleeve between which head 20 is reciprocably disposed.

The forward movement of head 20 and core 9 imparted by the spring 19 is limited by an actuating lever 29 in the form of a bell crank, having one end bifurcated as at 30 so as to embrace the flat portion of the core. Lever 29 is pivotally connected to core 9 by means of a screw 31 which is inserted through an opening 32 in the side of barrel 5 (Fig. 3). The lever protrudes outwardly from its connection to the core through a slot 33 in the side of barrel 5 with the opposite side 34 of the lever extending forwardly and normally diverging slightly with respect to the barrel. The upward tilt of lever 29 incident to forward movement of the core within the barrel in response to the urge of spring 19 is limited by the abutment of the lever against collar 14 and the back of the lever against the rearward end of slot 33.

It will thus be seen that upon depression of the side 34 of lever 29 the portion of the barrel adjacent the forward end of slot 33 operates as a fulcrum, causing the opposite pivoted end of the lever to shift rearwardly to impart corresponding movement of head 20 of the core to a sufficient degree to permit the welding rod 27 to be inserted through the ports 28 in the sleeve. With the rod properly adjusted, lever 29 is released and the retaining head is forced into frictional engagement with rod 27 in response to the urge of spring 19 so as to clamp rod 27 between the forward end of the elongated ports 28 and the opposed faces of the bifurcations 26 of the head. It will be apparent that the degree of lateral extension of the rod may be quickly and easily varied by slight depression of the lever which will release the engagement between head 20 and rod 27 and permit longitudinal movement of the rod.

In overhead welding it is desirable that the end of rod 27 adapted to be brought into contact with the work, be located forwardly of the tool, as well as laterally thereof. The present device is adapted to retain a welding rod in a position most suitable for this type of work. With the core of the device retracted, the rod is inserted through the open end 35 of sleeve 21 and then through one of the ports 28 in the side wall of the latter, each of the ports being elongated sufficiently to accommodate the rod. Release of the lever will thus clamp the rod between the bifurcations 26 of head 20 and an undercut surface 36 of the forward end of the slot 28 through which the rod extends, in response to the urge of spring 19 which is effective to maintain a firm frictional grip on the rod.

It will thus be seen that I have provided a completely insulated holder adapted to positively retain a welding rod in selectively either of two positions with respect to the axis of the tool which may be engaged and released for readjustment or removal of the rod by the simple actuation of a lever, and incorporating a plurality of ribs on the exterior thereof and air circulation passages through the outer barrel to facilitate the convection and radiation of heat transmitted thereto by conduction through the rod.

While I have shown and described but one embodiment of my invention, it will be apparent to those of skill in the art that numerous changes in size, design, shape and number of the various parts may be made, that any means well known in the art for connecting, releasably or otherwise, the lead wire 12 to the core may be substituted for that generally shown and described, and that the barrel 5, sleeve 21, and collar 14 may be composed of any well-known non-conducting material—all without departing from the spirit of my invention as defined in the appended claims.

What I claim and desire to secure by Letters Patent is:

1. In a welding rod holder, a tubular handle of insulating material, having an opening therethrough for a manipulating lever, a core within said tubular handle, said core being adapted to move longitudinally within said tubular handle, a helical spring within said tubular handle and around said core, said spring being adapted to normally urge a limited range of relative longitudinal movement between said tubular handle and said core, and a lever extending from said core through said opening in said tubular handle and fulcrumed upon an edge of said opening to resiliently manipulate movement between said handle and said core.

2. In a welding rod holder, a tubular member of electrical insulating material having a pair of openings through opposite of its walls adjacent one of its ends for the insertion therethrough of a welding rod, a core within said tubular member, said core being longitudinally movable relative to said tubular member and being provided with clamping jaws for a welding rod, means to resiliently longitudinally move said core with respect to said tubular member to clamp a welding rod between walls of said openings in said tubular member and said jaws of said core, and a manipulating lever having an operating handle extending toward a welding rod, said lever being pivoted at its inner end to said core and being fulcrumed in the wall of said tubular member.

3. In a device of the character described, a barrel having an opening for a manipulating lever, said barrel being composed of heat and electrical insulating material, said barrel having a concentric cylindrical bore therethrough and being provided with a series of outwardly extending annular fins and also with a series of air circulation holes extending therethrough, a collar and a sleeve, each of said latter being formed to slidingly fit the bore of said barrel, means to secure said collar and said sleeve, respectively, to said barrel, said collar and sleeve being, respectively, concentrically and cylindrically bored, an electrical conducting core having an enlarged cylindrical head within said collar and sleeve, said core being adapted for limited movement longitudinally with respect to said collar and sleeve, a helical spring seated at one end on an annular end of said collar and at the opposite end on the annular rim of said enlarged head adapted to resiliently urge said core longitudinally with respect to said sleeve, means to limit relative longitudinal movement between said sleeve and said core, and a lever pivoted to said core and fulcrumed on an edge of said opening in said barrel for manually moving said core relative to said collar and sleeve.

4. In a device of the character described, a barrel having an opening for a manipulating lever handle, said barrel having a cylindrical bore therethrough, a collar and a sleeve, each of said latter being formed to slidingly fit said bore of said barrel, means to secure said collar and said sleeve, respectively, against movement relative to said barrel, said collar and sleeve being, respectively, cylindrically bored, a core having an enlarged cylindrical head and being composed of electrical conducting material within said collar and sleeve, and adapted for limited movement longitudinally with respect to said collar and sleeve, a helical spring within said sleeve adapted to resiliently urge said core longitudinally with respect to said sleeve, means to limit relative longitudinal movement between said sleeve and said core, and a lever attached to said core and extending through said barrel and fulcrumed on an edge of the opening therethrough, and having its operating handle extending toward a welding rod for longitudinally moving said core against the tension of said spring.

THEODORE K. CHECKOS.